(12) United States Patent
Zheng et al.

(10) Patent No.: US 12,692,426 B2
(45) Date of Patent: Jul. 28, 2026

(54) ALUMINUM NITRIDE FILLED THERMALLY CONDUCTIVE SILICONE COMPOSITION

(71) Applicant: Dow Silicones Corporation, Midland, MI (US)

(72) Inventors: Yan Zheng, Shanghai (CN); Dorab Bhagwagar, Saginaw, MI (US); Darren Hansen, Auburn, MI (US); Peng Wei, Shanghai (CN); Han Guang Wu, Shanghai (CN)

(73) Assignee: Dow Silicones Corporation, Midland, MI (US)

( * ) Notice: Subject to any disclaimer, the term of this patent is extended or adjusted under 35 U.S.C. 154(b) by 580 days.

(21) Appl. No.: 18/041,749

(22) PCT Filed: Nov. 10, 2020

(86) PCT No.: PCT/CN2020/127668
§ 371 (c)(1),
(2) Date: Feb. 15, 2023

(87) PCT Pub. No.: WO2022/099432
PCT Pub. Date: May 19, 2022

(65) Prior Publication Data
US 2023/0313016 A1 Oct. 5, 2023

(51) Int. Cl.
| | |
|---|---|
| *C09K 5/14* | (2006.01) |
| *C08K 3/22* | (2006.01) |
| *C08K 3/28* | (2006.01) |
| *C08K 5/5419* | (2006.01) |
| *C08K 7/18* | (2006.01) |
| *C08K 13/04* | (2006.01) |
| *C08L 83/04* | (2006.01) |

(52) U.S. Cl.
CPC .................. *C09K 5/14* (2013.01); *C08K 3/22* (2013.01); *C08K 3/28* (2013.01); *C08K 13/04* (2013.01); *C08L 83/04* (2013.01); *C08K 2003/2227* (2013.01); *C08K 2003/2296* (2013.01); *C08K 2003/282* (2013.01); *C08K 5/5419* (2013.01); *C08K 7/18* (2013.01); *C08K 2201/001* (2013.01); *C08K 2201/005* (2013.01); *C08K 2201/019* (2013.01); *C08L 2203/20* (2013.01); *C08L 2205/025* (2013.01); *C08L 2312/00* (2013.01)

(58) Field of Classification Search
CPC ... C09K 5/14; C08K 3/22; C08K 3/28; C08K 13/04; C08K 5/5419; C08K 7/18; C08K 2003/2227; C08K 2003/2296; C08K 2003/282; C08K 2201/001; C08K 2201/005; C08K 2201/019; C08K 9/06; C08K 9/08; C08K 2003/385; C08K 5/0025; C08L 83/04; C08L 2203/20; C08L 2205/025; C08L 2312/00; C08G 77/12; C08G 77/18; C08G 77/20
See application file for complete search history.

(56) References Cited

U.S. PATENT DOCUMENTS

| | | | | |
|---|---|---|---|---|
| 5,883,215 | A * | 3/1999 | Bischoff | ................ C08G 77/08 528/21 |
| 10,647,830 | B2 | 5/2020 | Ito | |
| 11,248,154 | B2 | 2/2022 | Ishihara et al. | |
| 2015/0359134 | A1 * | 12/2015 | Soong | .................. H05K 1/0203 361/720 |
| 2018/0134938 | A1 | 5/2018 | Hirakawa et al. | |
| 2019/0106594 | A1 * | 4/2019 | Bordoloi | .................. C09D 7/68 |
| 2019/0292349 | A1 * | 9/2019 | Ito | ............................ C09K 5/10 |
| 2021/0147681 | A1 | 5/2021 | Hirakawa et al. | |
| 2021/0332280 | A1 | 10/2021 | Hu et al. | |
| 2021/0403716 | A1 | 12/2021 | Hu et al. | |

FOREIGN PATENT DOCUMENTS

| | | |
|---|---|---|
| CN | 106281206 | 1/2017 |
| CN | 110982277 | 4/2020 |
| EP | 3992250 | 5/2022 |
| WO | 2020093258 | 5/2020 |
| WO | 2020133374 | 7/2020 |
| WO | 2021109051 | 6/2021 |

* cited by examiner

*Primary Examiner* — Mark Eashoo
*Assistant Examiner* — Zhen Liu
(74) *Attorney, Agent, or Firm* — Steven W. Mork

(57) ABSTRACT

A composition contains: (a) curable silicone composition including: (i) a vinyldimethylsiloxy-terminated polydimethylpolysiloxane with a viscosity of 30 to 400 mPa*s; (ii) a SiH functional crosslinker; and (iii) a hydrosilylation catalyst; where the molar ratio of crosslinker SiH functionality to vinyl functionality is 0.5:1 to 1:1; (b) alkyl trialkoxysilane and/or a mono-trialkoxysiloxy terminated dimethylpolysiloxane treating agent; (c) filler mix containing: (i) 40 wt % or more of spherical and irregular shaped AlN particles, both having an average size of 30 micrometers or more, the spherical AlN fillers are 40-60 wt % of the weight of the AlN fillers; (ii) 25-35 wt % spherical $Al_2O_3$ particles with an average size of 1-5 micrometers; (iii) 10-15 wt % of additional thermally conductive filler with a 0.1-0.5 micrometer average size; and (iv) optionally, BN fillers having an average size greater than 20 micrometers; where filler mix is 90-97 wt % and wt % is relative to composition weight unless otherwise stated.

10 Claims, No Drawings

ALUMINUM NITRIDE FILLED THERMALLY CONDUCTIVE SILICONE COMPOSITION

FIELD OF THE INVENTION

The present invention relates to a thermally conductive silicone composition that contains aluminum nitride fillers.

INTRODUCTION

An industry drive to smaller and more powerful electronic devices has increased demands on thermally conductive materials useful for dissipating heat generated in such devices. For instance, the telecommunications industry is going through a generational shift to 5G networks, which demand highly integrated electrical devices with smaller sizes and that brings a requirement for double the power requirements (1200 Watts from 600 Watts). The heat generated by the high power in the smaller devices would damage the device if not efficiently dissipated. Thermally conductive interface materials are often used in electronics to thermally couple heat generating components and heat dissipating components. In order to efficiently transfer heat between coupled components, the thermally conductive composition desirably has a thermal conductivity of at least 8.0 Watts per meter*Kelvin (W/m*K) as measured according to ASTM method D5470. At the same time, as electronic devices become smaller it becomes more important to accurately and precisely apply the thermally conductive to the appropriate components during a rapid production process. In that regard, it is desirable for the thermally conductive material to have an extrusion rate (ER) of greater than 40 grams per minute (g/min) as measured at a pressure of 0.62 MegaPascals (90 pounds per square inch) with a standard 30 cubic centimeter EFD syringe package using the procedure described herein below.

Simultaneously achieving such a thermal conductivity and extrusion rate in a thermally conductive material is challenging. Increasing the amount of thermally conductive filler can increase the thermal conductivity, but also increases the viscosity, which inhibits the extrusion rate. Boron nitride is a highly thermally conductive filler so it is conceivable that it would be able to increase thermal conductivity of a composition at a low enough concentration to avoid too high of a viscosity. However, boron nitride has a platelet-like shape so even at concentrations of 40 volume-percent or more the viscosity of the thermally conductivity composition becomes too high to achieve an ER of greater than 40 g/min.

There remains a need to identify a thermally conductive composition that can simultaneously achieve an ER of greater than 40 g/min and a thermal conductivity of at least 8.0 W/m*K.

BRIEF SUMMARY OF THE INVENTION

The present invention provides a thermally conductive material that simultaneously achieves an extrusion rate of greater than 40 g/min and a thermal conductivity of at least 8.0 W/m*K. Moreover, the thermally conductive material is reactive and can cure into a cured thermally conductive material.

The present invention is partly a result of discovering that a particular blend of spherical and irregular shaped aluminum nitride fillers that have particle sizes of 30 micrometers or more can be blended with a specific amount of spherical aluminum oxide fillers having a particle size of one to 5 micrometers and an additional amount of filler having an average particle size of 0.1 to 0.5 micrometers will provide a thermally conductive material that simultaneously achieves an ER of greater than 40 g/min and a thermal conductivity of at least 8.0 W/m*K—even in an absence of boron nitride.

In a first aspect, the present invention is a thermally conductive composition comprising: (a) a curable silicone composition comprising: (i) a vinyldimethylsiloxy-terminated polydimethylpolysiloxane having a viscosity in a range of 30 to 400 milliPascal*seconds; (ii) a silicon-hydride functional crosslinker; and (iii) a hydrosilylation catalyst; where the molar ratio of silicon-hydride functionality from the crosslinker to vinyl functionality is in a range of 0.5:1 to 1:1; (b) a filler treating agent comprising one or both of an alkyl trialkoxysilane and a mono-trialkoxysiloxy terminated dimethylpolysiloxane; (c) a thermally conductive filler mix comprising: (i) 40 weight-percent or more aluminum nitride fillers comprising a blend of spherical and irregular shaped aluminum nitride particles, both the spherical and irregular shaped particles having an average particle size of 30 micrometers or more and where the spherical aluminum nitride fillers with a particle size of 30 micrometers or more are present at a concentration of 40 to 60 weight-percent of the total weight of aluminum nitride fillers having a particle size of 30 micrometers or more; (ii) 25 weight-percent to 35 weight-percent spherical aluminum oxide particles having an average particle size of one to 5 micrometers; (iii) 10 weight-percent to 15 weight-percent of an additional thermally conductive filler having an average particle size of 0.1 to 0.5 micrometers; and (iv) optionally, boron nitride fillers having an average particle size of more than 20 micrometers; where the weight-percent of each thermally conductive filler is relative to composition weight unless otherwise stated and the total amount of thermally conductive filler mix is 90-97 weight-percent of the composition weight.

In a second aspect, the present invention is an article comprising the thermally conductive composition of the first aspect on another material.

The thermally conductive composition of the present invention is useful, for example, as a thermally conductive interface material between components of electronic devices.

DETAILED DESCRIPTION OF THE INVENTION

Test methods refer to the most recent test method as of the priority date of this document when a date is not indicated with the test method number. References to test methods contain both a reference to the testing society and the test method number. The following test method abbreviations and identifiers apply herein: ASTM refers to ASTM International methods; EN refers to European Norm; DIN refers to Deutsches Institut für Normung; ISO refers to International Organization for Standards; and UL refers to Underwriters Laboratory.

Products identified by their tradename refer to the compositions available under those tradenames on the priority date of this document.

"Multiple" means two or more. "And/or" means "and, or as an alternative". All ranges include endpoints unless otherwise indicated. Unless otherwise stated, all weight-percent (wt %) values are relative to composition weight and all volume-percent (vol %) values are relative to composition volume.

"Viscosity" for individual polysiloxanes is determined by ASTM D 445 using a glass capillary Cannon-Fenske type viscometer at 25 degrees Celsius (° C.) unless otherwise stated.

Determine chemical structure for polysiloxanes by standard $^{1}$H, $^{13}$C and $^{29}$Si nuclear magnetic resonance (NMR) analysis. Determine average particle size for filler particles as the median particle size (D50) using laser diffraction particle size analyzers (CILAS920 Particle Size Analyzer or Beckman Coulter LS 13 320 SW) according to the operation software.

The thermally conductive composition comprises a curable silicone composition that itself comprises a vinyldimethylsiloxy-terminated polydimethylpolysiloxane (PDMS), a silicon-hydride (SiH) functional crosslinker and a hydrosilylation catalyst. The relative concentration of vinyldimethylsiloxy-terminated PDMS and SiH functional crosslinker is such that the molar ratio of SiH functionality from the crosslinker to vinyl functionality is in a range of 0.5:1 to 1:1, and can be 0.5:1 or more, 0.6:1 or more, 0.7:1 or more, 0.8:1 or more, even 0.9:1 or more while at the same time is 1:1 or less and can be 0.9:1 or less, 0.8:1 or less, 0.7:1 or less, or even 0.6:1 or less.

The vinyldimethylsiloxy-terminated PDMS has a viscosity of 30 milliPascal*seconds (mPa*s) or more, preferably 45 mPa*s or more, 60 mPa*s or more and can have a viscosity of 90 mPa*s or more, 100 mPa*s or more, 120 mPa*s or more, 140 mPa*s or more, 160 mPa*s or more, even 180 mPa*s or more, while at the same time has a viscosity of 400 mPa*s or less, 300 mPa*s or less, 200 mPa*s or less, 180 mPa*s or less, even 160 mPa*s or less, 140 mPa*s or less, 120 mPa*s or less, 100 mPa*s or less, 80 mPa*s or less or even 60 mPa*s or less. If the viscosity is too high, then the thermally conductive composition will have too high of a viscosity to achieve the desired extrusion rate. If the viscosity is too low, then the thermally conductive composition risks having a viscosity that is so low that mechanical properties will be poor and chalking can occur.

The vinyl dimethylsiloxy-terminated PDMS desirably has the following chemical structure (I):

$$Vi(CH_3)_2SiO - [(CH_3)_2SiO]_n - Si(CH_3)_2Vi \qquad (I)$$

where: "Vi" refers to a vinyl group ($-CH{=}CH_2$) and n refers to the average number of dimethylsiloxane units, which is the degree of polymerization (DP) for the vinyldimethylsiloxy-terminated PDMS. Select n so as to achieve the desired viscosity for the vinyldimethylsiloxy-terminated PDMS. Typically, n is a value of 25 or more, and can be 30 or more, 35 or more, 40 or more, 45 or more, 50 or more, 60 or more 70 or more, 80 or more, even 90 or more while at the same time is typically 200 or less, 190 or less, 180 or less, 170 or less, 160 or less, 150 or less, 140 or less, 130 or less, 120 or less, 100 or less, 90 or less, 80 or less, 70 or less, 60 or less, even 50 or less.

Desirably, the vinyldimethylsiloxy-terminated PDMS comprises 1.2 to 1.4 wt % vinyl functionality.

Suitable divinyl PDMS materials can be made by ring-opening polymerization of cyclosiloxanes with vinyl end blockers for termination as taught in U.S. Pat. No. 5,883,215A. Suitable divinyl PDMS that is commercially available includes polysiloxane available under the name DMS-V21 from Gelest.

The SiH functional crosslinker is a polysiloxane containing SiH functionality. Desirably, the SiH functional crosslinker contains 2 or more, even 3 or more, SiH functionalities per molecule. Preferably, the SiH functional crosslinker has a concentration of SiH that is 0.1 wt % or more, 0.2 wt % or more, 0.3 wt % or more, 0.4 wt % or more, 0.5 wt % or more, and can be 0.6 wt % or more, 0.7 wt % or more, 0.8 wt % or more, even 0.9 wt % or more while at the same time is 1.0 wt % or less, 0.9 wt % or less, 0.8 wt % or less, 0.7 wt % or less, 0.6 wt % or less, 0.5 wt % or less, even 0.4 wt % or less, or 0.3 wt % or less based on weight of the SiH functional crosslinker.

The SiH functional crosslinker can desirably comprise one or more than one polysiloxane having chemical structures selected from (II) and (III):

$$H(CH_3)_2SiO - [(CH_3)_2SiO)]_x - Si(CH_3)_2H \qquad (II)$$

$$(CH_3)_3SiO - [(CH_3)HSiO]_y[(CH_3)_2)SiO]_z - Si(CH_3)_3 \qquad (III)$$

where:

subscript x has a value in a range of 10 to 100, and can be 10 or more, 15 or more, 20 or more, 30 or more, 40 or more, 50 or more, 60 or more, 70 or more, even 80 or more and at the same time is generally 100 or less, 90 or less, 80 or less, 70 or less, 60 or less, 50 or less, 40 or less, 30 or less, or even 20 or less;

subscript y has a value in a range of 3 to 30, and can be 3 or more, 4 or more, 5 or more, 10 or more, 15 or more, 20 or more, even 25 or more and at the same time is generally 30 or less, 25 or less, 20 or less, 15 or less, 10 or less, 9 or less, 8 or less, 7 or less, 6 or less, 5 or less, or even 4 or less; and subscript z has a value in a range of 3 to 100, and can be 3 or more, 5 or more, 10 or more, 15 or more, 20 or more, 30 or more, 40 or more, 50 or more, 60 or more, 70 or more, even 80 or more while at the same time is generally 100 or less, 90 or less, 80 or less, 70 or less, 60 or less, 50 or less, 40 or less, 30 or less, 20 or less, 10 or less and can be 5 or less, even 4 or less.

Suitable commercially available SiH functional crosslinkers include those available under the names HMS-071, MHS-301 and DMS-H11 all available from Gelest.

The hydrosilylation catalyst can be any hydrosilylation catalyst. Desirably, the hydrosilylation catalyst comprises a platinum-based catalyst such as Speier's catalyst (H2PtCl6) and/or Karstedt's catalyst (an organoplatinum compound derived from divinyl-containing disiloxane, also identified as platinum-divinyltetramethyldisiloxane complex or 1,3-diethenyl-1,1,3,3 tetramethyldisiloxane platinum complex). The hydrosilylation catalyst can be encapsulated (typically, in a phenyl resin) or non-encapsulated. The concentration of hydrosilylation catalyst is typically present at a concentration of 0.01 wt % or more, 0.02 wt % or more, 0.03 wt % or more, 0.04 wt % or more, even 0.05 wt % or more while at the same time 0.10 wt % or less, 0.09 wt % or less, 0.08 wt % or less, 0.07 wt % or less, or even 0.06 wt % or less relative to thermally conductive composition weight.

The thermally conductive composition also comprises one or more than one filler treating agent. The filler treating agent comprise one or both of an alkyl trialkoxysilane and a mono-trialkoxysiloxyterminated dimethylpolysiloxane.

The alkyltrialkoxysilane is desirably a 6 to 20 carbon (C6-20) alkyl trimethoxy silane, preferably a C8-C12 alkyl trimethoxy silane and can be n-decyltrimethoxy silane. Suitable alkyltrialkoxysilanes include n-decyltrimethoxysilane, available from Dow, Inc. as DOWSIL™ Z-6210 Silane (DOWSIL is a trademark of The Dow Chemical Company) or under the name SID2670.0 from Gelest.

Examples of suitable mono-trialkoxysiloxyterminated dimethylpolysiloxanes have chemical structure (IV):

$$(CH_3)_3SiO - [(CH_3)_2SiO]_a - Si(OR')_3 \qquad\qquad (IV)$$

where subscript a has a value 20 or more, and can be 30 or more, 40 or more, 50 or more, 60 or 30 more, 70 or more, 80 or more, even 90 or more while at the same time is typically 150 or less, 140 or less, 130 or less, 120 or less 110 or less, 100 or less, 90 or less, 80 or less, 70 or less, 60 or less, 50 or less, 40 or less, even 30 or less. Values for a of 20 or more (degree of polymerization of 20 or more) are desirable because the mono-trialkoxysiloxyterminated dimethylpolysiloxane has greater stability than when a is less than 20. However, it is desirable to keep the value of a below 150 because shorter chain lengths have better efficiently to lower viscosity than longer chain lengths. R' is an alkyl group, preferably containing one to 12 carbon atoms (C1-C12), and most preferably is methyl.

Suitable mono-trialkoxysiloxy terminated dimethylpolysiloxanes can be synthesized according the teachings in US2006/0100336.

Desirably, the alkyltrialkoxysilane is typically present at a concentration of 1.8 wt % or more, 2.0 wt % or more, 2.5 wt % or more, 3.0 wt % or more, even 3.5 wt % or more, while at the same time is typically present at a concentration of 4.0 wt % or less, 3.5 wt % or less, or even 3.0 wt % or less with wt % relative to thermally conductive composition weight.

At the same time, or alternatively, the mono-trialkoxysiloxyterminated dimethylpolysiloxane is desirably present at a concentration of 0.05 wt % or more, 0.1 wt % or more, 0.2 wt % or more, 0.3 wt % or more or even 0.4 wt % or more while at the same time is typically present at a concentration of 0.5 wt % or less, 0.4 wt % or less, 0.3 wt % or less, or 0.2 wt % or less relative to thermally conductive composition weight.

The thermally conductive composition further comprises a thermally conductive filler mix. The thermally conductive filler mix contains all of the thermally conductive filler in the thermally conductive composition. Thermally conductive filler refers to particulates that facilitate thermal conduction through the thermally conductive composition.

The filler mix comprises a blend of spherical and irregular shaped aluminum nitride particles. "Spherical" shaped particles refers to particles that have an aspect ratio of 1.0+/0.2. Determine the aspect ratio of a particle using scanning electron microscope (SEM) imaging and by taking the average ratio of the longest dimension (major axis) and shortest dimension (minor axis) of at least ten particles. "Irregular" shaped particles have an aspect ratio other than 1.0+/−0.2 and have at least three faces evident by SEM imaging (distinguishing the particles from "platelets", which have 2 faces).

Both the spherical and irregular aluminum nitride fillers have an average particle size of 30 micrometers or more while at the same time typically have an average particle size of 200 micrometers or less, 175 micrometers or less, 150 micrometers or less, 125 micrometers or less, 100 micrometers or less, or even can have an average particle size of 90 micrometers or less, or 80 micrometers or less.

The concentration of aluminum nitride fillers from this blend, and desirably as a sum of any and all aluminum nitride fillers, in the thermally conductive composition is 40 wt % or more, and can be 41 wt % or more, 42 wt % or more, 43 wt % or more, 44 wt % or more, 45 wt % or more, 50 wt % or more, 55 wt % or more, and can have 60 wt % or more while at the same time is generally 63 wt % or less, 60 wt % or less, 55 wt % or less, 50 wt % or less 45 wt % or less and can be 44 wt % or less, even 43 wt % or less based on thermally conductive composition weight.

The spherical aluminum nitride particles are present at a concentration of 40 wt % or more, 45 wt % or more, 50 wt % or more, or even 55 wt % or more while at the same time is present at a concentration of 60 wt % or less, and can be 55 wt % or less, 50 wt % or less, even 45 wt % or less with wt % relative to total weight of aluminum nitride fillers having a particles size of 30 micrometers or more. Notably, the thermally conductive composition can have aluminum nitride filler particles in addition to this particular blend of spherical and irregular shaped aluminum nitride particles just described or the thermally conductive composition can be free of aluminum nitride filler particles in addition to this particular blend of spherical and irregular shaped aluminum nitride particles just described.

The thermally conductive filler mix further comprises spherical aluminum oxide particles. The spherical aluminum oxide particles have an average particle size of one micrometer or more, and can be 2 micrometers or more, 3 micrometers or more, or even 4 micrometers or more while at the same time have an average particle size of 5 micrometers or less and can have an average particle size of 4 micrometers or less, even 3 micrometers or less, or 2 micrometers or less. The concentration of the spherical aluminum oxide particles is 25 wt % or more, and can be 30 wt % or more while at the same time is 35 wt % or less, and can be 30 wt % or less based on thermally conductive composition weight.

The thermally conductive filler mix further comprises one or more than one additional thermally conductive filler having an average particle size of 0.1 micrometers or more, 0.2 micrometers or more, 0.3 micrometers or more, or even 0.4 micrometers or more while at the same time has an average particle size of 0.5 micrometers or less, and can have an average particle size of 0.4 micrometers or less, 0.3 micrometers or less, or even 0.2 micrometers or less. The total amount of additional thermally conductive filler is 10 wt % or more and can be present at a concentration of 11 wt % or more, 12 wt % or more, 13 wt % or more, even 14 wt % or more, while at the same time is 15 wt % or less, 14 wt % or less, 13 wt % or less, and can be 12 wt % or less, or even 11 wt % or less with wt % relative to thermally conductive composition weight. Select the additional thermally conductive filler from any filler known in the art including metal nitrides and metal oxides (such as aluminum oxide, magnesium oxide, and zinc oxide). Desirably, the additional thermally conductive filler is zinc oxide.

Optionally, the thermally conductive filler mix can contain boron nitride fillers having an average particle size of more than 20 micrometers. At the same time, typically, the boron nitride fillers will have an average particle size of 200 micrometer or less, 175 micrometers or less, 150 micrometers or less, 125 micrometer or less, and even 100 micrometers or less, 75 micrometers or less, or 50 micrometers or less.

The thermally conductive filler can comprise thermally conductive fillers in addition to those mentioned or can be free of thermally conductive fillers other than those mentioned. The thermally conductive filler mix desirably consists of the aluminum nitride fillers, aluminum oxide particles, additional thermally conductive filler, and optional boron nitride fillers just described. The thermally conductive filler mix (and thermally conductive composition as a whole) can be free of magnesium oxide fillers, boron nitride fillers, or both magnesium oxide fillers and boron nitride fillers.

The concentration of thermally conductive filler mix in the thermally composition is 90 wt % or more, and can be 91 wt % or more, 92 wt % or more, 93 wt % or more, 94 wt % or more, 95 wt % or more, even 96 wt % or more while at the same time is 97 wt % or less, and can be 96 wt % or less, even 95 wt % or less based on thermally conductive composition weight.

The thermally conductive composition can further comprise or be free of any one or any combination of more than one of the following additional components: inhibitors (such as methyl(tris(1,1-dimethyl-2-propynyloxy))silane), heat stabilizers and/or pigments (such as coper phthalocyanine powder), thixotropic agents, fumed silica (preferably, surface treated), and spacer additives (such as glass beads).

The thermally conductive composition achieves an extrusion rate of greater than 40 g/min as measured at a pressure of 0.62 MegaPascals (90 pounds per square inch) with a standard 30 cubic centimeters EFD syringe package (further details provided below under Extrusion Rate Characterization). Such a characteristic make the thermally conductive composition easily dispensable for applying onto another material.

At the same time, the thermally conductive composition achieves the objective of having a thermal conductivity of at least 8.0 W/m*K as measured according to ASTM D-5470 using LonGwin Model LW 9389 TIM thermal resistance and conductivity measurement apparatus. Having such a high thermal conductivity and by being easily dispensable makes the thermally conductive composition particularly useful as thermal interface materials (TIMs). TIMs are used to thermally couple two articles or components of a device. For instance, a TIM is useful to thermally couple a heat generating device with a heat sink, cooling plate, metal cover or other heat dissipating component, especially in electronics. In such an application, the thermally conductive composition resides between and in thermal contact with at least two components, typically a heat generating device and at least one of a heat sink, cooling plate, metal cover or other heat dissipating component.

EXAMPLES

Table 1 lists the materials for use in the thermally conductive composition of the samples described herein below. Note: "Vi" refers to a vinyl group. "Me" refers to a methyl group. SYL-OFF and DOWSIL are a trademarks of The Dow Chemical Company.

TABLE 1

| Component | Description | Source |
| --- | --- | --- |
| Vi Polymer A1-1 | Vinyl dimethyl terminated PDMS (with viscosity of 78 mPa * s and 1.25 wt % vinyl). | Available as SMS-V21 from Gelest. |
| Vi Polymer A1-2 | Vinyl dimethyl terminated PDMS (with viscosity of 78 mPa * s and 1.25 wt % vinyl). Average chemical structure: $ViMe_2SiO-[Me_2SiO]_{45}-SiMe_2Vi$. | Synthesize by ring-opening polymerization of cyclosiloxanes with vinyl end-blockers for termination as described in U.S. Pat. No. 5,883,215. |
| Crosslinker A2-1 | Trimethyl terminated dimethyl-co-hydrogen methyl polysiloxane with viscosity of 19 mPa * s and 0.11 wt % SiH. | Available as HMS-071 from Gelest. |
| Crosslinker A2-2 | Trimethyl terminated dimethyl-co-hydrogen methyl polysiloxane with viscosity of 14 mPa * s and 0.36 wt % SiH. | Available as HMS-301 from Gelest. |
| Crosslinker A2-3 | Hydride terminated PDMS with viscosity of 7-10 mPa * s and 0.16 wt % SiH. | Available as HMS-H11 from Gelest. |
| Treating Agent B-1 | n-decyltrimethoxysilane | Available as SID2670.0 from Gelest. |
| Treating Agent B-2 | Monotrimethoxysiloxy and trimethylsiloxy terminated PDMS having an average molecular structure of: $Me_3SiO[Me_2SiO]_{30}Si(OMe_3)_3$ | Synthesize according to the teachings in US2006/0100336. |
| Treating Agent B-3 | Monotrimethoxysiloxy and trimethylsiloxy terminated PDMS having an average molecular structure of: $Me_3SiO[Me_2SiO]_{110}(OMe_3)_3$ | Synthesize according to the teachings in US2006/0100336. |
| TC Filler C1-1 | Spherical Aluminum Nitride particles with an average particle size of 80 micrometers. | Available as ANF S-80 ST204 from Maruwa Ceramic Co. Ltd. of Japan |
| TC Filler C1-2 | Spherical Aluminum Nitride particles with an average particle size of 30 micrometers | Available as ANF S-30 ST204 from Maruwa Ceramic Co. Ltd. of Japan |
| TC Filler C1-3 | Spherical Aluminum Nitride particles with an average particle size of 10 micrometers | Available as FS-P10S from Foxsine of China |
| TC Filler C1-4 | Irregular Aluminum Nitride particles with an average particle size of 50 micrometers | Available as AN-HF50LG-HT from Combustion Synthesis Co. Ltd. of Japan |
| TC Filler C1-5 | Irregular Aluminum Nitride particles with an average particle size of 70 micrometers | Available as AN-HF70LG-HT from Combustion Synthesis Co. Ltd. of Japan |
| TC Filler C1-6 | Irregular Aluminum Nitride particles with an average particle size of 60 micrometers | Available as AN-HF60LG-HT from Combustion Synthesis Co. Ltd. of Japan |
| TC Filler C1-7 | Spherical Magnesium Oxide particles with an average particle size of 60 micrometers | Available as DMG-60 from Denka of Japan |

TABLE 1-continued

| Component | Description | Source |
|---|---|---|
| TC Filler C2-1 | Spherical Aluminum Oxide (Alumina) with average particle size of 2 micrometers. | Available as CB-P02 from Showa Denkoi Col. Ltd. of Japan. |
| TC Filler C2-2 | Irregular Aluminum Oxide (Alumina) with average particle size of 2 micrometers. | Available as P662SB from Alteo Shanghai Co. Ltd. of China. |
| TC Filler C2-3 | Spherical Aluminum Oxide (Alumina) with average particle size of 10 micrometers. | Available as DAW-10 from Denka of Japan |
| TC Filler C3-1 | Crushed Zinc Oxide particles with an average particle size of 0.12 micrometers. | Available as Zoco 102 from Zochem, Inc. |
| TC Filler C3-2 | Spherical Aluminum Oxide (Alumina) with average particle size of 0.3 micrometers. | Available as ASFP-03S from Denka of Japan |
| TC Filler C4-1 | Boron Nitride with average particle size of 125 micrometers | Available as AC6091 from Momentive Performance Materials, USA. |
| Catalyst D-1 | Karstedt's Catalyst composition | Available as SYL-OFF ™ 4000 catalyst from the Dow Chemical Company. |
| Catalyst D-2 | Karstedt's Catalyst, encapsulated. 40 wt % Karstedt's Catalyst dispersed in thermoplastic silicone resin*. | Prepare according to description in U.S. Pat. No. 4,766,176. |
| Inhibitor E-1 | Methyl(tris(1,1-dimethyl-2-propynyloxy))silane | Available from Alfa Chemistry as ACM83817714. |
| Pigment F-1 | Copper Phthalocyanine Powder (CuPc) (40-wt %) dispersed by 3-roll mill in trimethyl terminated PDMS, 350 mPa * s viscosity. | Copper Phthalocyanine Powder available as Alfa-Aesar Catalogue No. 43650-09 and PDMS is DOWSIL ™ 200 Fluid 350 cSt. |

*Silicone resin is 78 mol % monophenylsiloxane units and 22 mol % dimethylsiloxanes units, softening point of 80-90° C.; 55 wt % hexamethyldisilazane-treated fumed silica. The catalyst has a Pt content of 0.16 percent by weight.

Sample Preparation

Formulations for the samples are in Tables 2 and 3, with the amount of each component reported in grams (g). Note: "Wt % spherical AlN" refers to wt % of spherical AlN that is 30 micrometers or larger relative to all AlN particles that are 30 micrometer or greater Prepare samples using a SpeedMixer™ DAC 400 FVZ from Flack Components to mix the components together. To a cup of the SpeedMixer add the Vi Polymer, Crosslinker, treating agent, and the C2 and C3 TC fillers. Mix at 1000 revolutions per minute (RPM) for 20 seconds, then 1500 RPM for 20 seconds. Add half of the C1 TC fillers and mix at 1000 revolutions per minute (RPM) for 20 seconds, then 1500 RPM for 20 seconds. Add the remaining C1 TC fillers and mix in the same way. Scrape the composition in the cup to ensure mixing and then add the Inhibitor E-1 and Pigment F-1 and mix in like manner to obtain the thermally conductive composition sample.

Sample Characterization

Characterize each sample for extrusion rate and thermal conductivity using the following test methods:

Extrusion Rate Characterization. Determine extrusion rate ("ER") for a sample using Nordson EFD dispensing equipment. Package sample material into a 30 cubic centimeter syringe with a 2.54 millimeter opening (EFD syringe form Nordson Company). Dispense sample through the opening by applying a pressure of 0.62 MPa to the syringe. The mass of the sample in grams (g) extruded after one minute corresponds to the extrusion rate in grams per minute (g/min) The objective of the present invention is to achieve an extrusion rate of greater than 40 g/min, preferably 50 g/min or more, and even more preferably 60 g/min or more. Notably, some samples were powdery pastes that could not be extruded so they are reported as having an ER of 0 (and TC was not measured).

Thermal Conductivity Characterization. Measure thermal conductivity ("TC") for each sample according to ASTM D-5470 using LonGwin Model LW 9389 TIM thermal resistance and conductivity measurement apparatus from Longwin Science and Technology Corporation, Taiwan. The objective of the present invention is to achieve a thermal conductivity of at least 8.0 Watts per meter*Kelvin (W/m*K).

TABLE 2

| Component | Sample | | | | | | |
|---|---|---|---|---|---|---|---|
| | 1 | 2 | 3 | 4 | 5 | 6 | 7 |
| Vi Polymer A1-1 | 2.26 | 2.26 | 2.26 | 2.26 | 2.26 | 2.14 | 2.14 |
| Crosslinker A2-1 | | | | | | 0.56 | 0.56 |
| Crosslinker A2-2 | 0.03 | 0.03 | 0.03 | 0.03 | 0.03 | 0.02 | 0.02 |
| Crosslinker A2-3 | 0.65 | 0.65 | 0.65 | 0.65 | 0.65 | | |
| Treating Agent B-1 | 0.19 | 0.19 | 0.19 | 0.19 | 0.19 | 0.20 | 0.20 |
| Treating Agent B-2 | 1.64 | 1.64 | 1.64 | 1.64 | 1.64 | 1.70 | 1.70 |
| | | | | TC Fillers | | | |
| C1-1 | 26.50 | 26.50 | 17.36 | 17.36 | | 20.00 | 20.00 |
| C1-2 | | | | | 17.36 | | |
| C1-4 | 17.36 | | 26.50 | | | | |
| C1-5 | | 17.36 | | 26.50 | 26.50 | 30.50 | |
| C1-6 | | | | | | | 30.50 |
| C2-1 | 32.35 | 32.35 | 32.35 | 32.35 | 32.35 | 30.20 | 30.20 |

TABLE 2-continued

| Component | Sample | | | | | | |
|---|---|---|---|---|---|---|---|
| | 1 | 2 | 3 | 4 | 5 | 6 | 7 |
| C3-1 | 15.86 | 15.86 | 15.86 | 15.86 | 15.86 | 14.50 | 14.50 |
| C4-1 | 2.90 | 2.90 | 2.90 | 2.90 | 2.90 | | |
| Catalyst D-1 | 0.058 | 0.058 | 0.058 | 0.085 | 0.058 | 0.060 | 0.060 |
| Inhibitor E-1 | 0.060 | 0.060 | 0.060 | 0.060 | 0.060 | 0.002 | 0.002 |
| Pigment F-1 | 0.19 | 0.19 | 0.19 | 0.19 | 0.19 | 0.12 | 0.12 |
| Characterization | | | | | | | |
| SiH/Vi Ratio | 0.92 | 0.92 | 0.92 | 0.92 | 0.92 | 0.585 | 0.585 |
| Wt % Filler | 94.97 | 94.97 | 94.97 | 94.97 | 94.97 | 95.20 | 95.20 |
| Vol % Filler | 83.31 | 83.31 | 83.31 | 83.31 | 83.31 | 83.85 | 83.85 |
| Wt % spherical AlN | 0.6 | 0.6 | 0.4 | 0.4 | 0.4 | 0.4 | 0.4 |
| ER (g/min) | 60 | 52 | 52 | 41 | 45 | 74 | 65 |
| TC (W/m * K) | 8.25 | 8.57 | 8.47 | 8.77 | 8.66 | 8.13 | 8.04 |

TABLE 3

| Component | Sample | | | | | | | | | | | | |
|---|---|---|---|---|---|---|---|---|---|---|---|---|---|
| | A | B | C | D | E | F | G | H | I | J | K | L | M |
| Vi Polymer A1-1 | 2.26 | | 2.14 | | | 2.58 | 2.26 | 2.21 | 3.76 | 2.49 | 2.14 | 2.14 | 2.58 |
| A1-2 | | 2.17 | | 2.17 | 2.17 | | | | | | | | |
| Crosslinker A2-1 | | 0.53 | 0.56 | 0.53 | 0.53 | 0.50 | | 0.50 | 0.70 | 0.54 | 0.56 | 0.56 | 0.70 |
| A2-2 | 0.03 | 0.02 | 0.02 | 0.02 | 0.02 | 0.04 | 0.03 | 0.02 | 0.06 | 0.02 | 0.02 | 0.02 | 0.05 |
| A2-3 | 0.65 | | | | | | 0.65 | | | | | | |
| Treating Agent B-1 | 0.19 | 0.20 | 0.20 | 0.20 | 0.20 | .202 | 0.19 | 0.20 | 0.20 | 0.20 | 0.20 | 0.20 | 0.30 |
| B-2 | 1.64 | 1.70 | 1.70 | 1.70 | 0.70 | 1.70 | 1.64 | 1.70 | 1.70 | 1.70 | 1.70 | 1.70 | |
| B-3 | | | | | | | | | | | | | 2.00 |
| TC Fillers C1-1 | | | | 50.5 | | 18.6 | 26.5 | 22.0 | 48.4 | 20.6 | 40.4 | 10.1 | 49.1 |
| C1-2 | | | | | 50.5 | 21.2 | 17.4 | | | | | | |
| C1-3 | | | | | | | | | 24.5 | | | | |
| C1-4 | | | | | | 20.0 | | | | | | | |
| C1-5 | 43.9 | 50.5 | | | | | | | | | | | |
| C1-6 | | | 50.5 | | | | | | | 25.8 | 10.1 | 40.4 | |
| C1-7 | | | | | | | | 22.5 | | | | | |
| C2-1 | 32.4 | 30.2 | 30.2 | 30.2 | 30.2 | | 32.4 | 32.7 | | | 30.2 | 30.2 | 29.3 |
| C2-2 | | | | | | 35.0 | | | | 33.0 | | | |
| C2-3 | | | | | | | | | | 15.5 | | | |
| C3-1 | 15.9 | 14.5 | 14.5 | 14.5 | 14.5 | | 15.9 | 18 | | | 14.5 | 14.5 | 13.9 |
| C3-2 | | | | | | | | | 20.5 | | | | |
| C4-1 | 2.90 | | | | | | 2.9 | | | | | | |
| Catalyst D-1 or (D-2) | 0.06 | 0.06 | 0.06 | 0.06 | 0.06 | 0.06 | 0.06 | 0.06 | 0.06 | 0.06 | 0.06 | 0.06 | (0.15) |
| Inhibitor E-1 | 0.01 | 0.002 | 0.002 | 0.002 | 0.002 | 0.002 | 0.006 | 0.002 | 0.002 | 0.002 | 0.002 | 0.002 | 0.004 |
| Pigment F-1 | 0.19 | 0.12 | 0.12 | 0.12 | 0.12 | 0.12 | 0.12 | 0.19 | 0.12 | 0.12 | 0.12 | 0.12 | 0.12 |
| Characterization | | | | | | | | | | | | | |
| SiH/Vi ratio | 0.92 | 0.55 | 0.59 | 0.55 | 0.55 | 0.54 | 0.92 | 0.55 | 0.53 | 0.54 | 0.58 | 0.58 | 0.66 |
| Wt % Filler | 95.0 | 95.2 | 95.2 | 95.2 | 95.2 | 94.8 | 95.0 | 95.2 | 93.4 | 94.9 | 95.2 | 95.2 | 94.1 |
| Vol % Filler | 83.3 | 83.9 | 83.8 | 83.9 | 83.9 | 83.5 | 83.3 | 83.3 | 80.2 | 83.5 | 83.8 | 83.8 | 80.9 |
| Wt % spherical AlN | 0 | 0 | 0 | 1 | 1 | 0.67 | 1 | 1 | 1 | 0.44 | 0.8 | 0.2 | 1 |
| ER (g/min) | 19 | 4 | 20 | 118 | 78 | 0 | 106 | 73 | 128 | 0 | 94 | 47 | 72 |
| TC (W/m * K) | 9.48 | 9.00 | 7.84 | 7.65 | 7.15 | NA | 7.70 | 7.28 | 6.35 | NA | 7.15 | 7.60 | 7.30 |

Data Analysis/Discussion

The formulations in Table 2 all achieve both objectives of an ER of greater than 40 g/min and a TC of greater than 8.0 W/m*K. In contrast, the formulations in Table 3 fail to achieve at least one of those objectives.

Samples 1-7 demonstrate thermally conductive compositions that vary the wt % spherical aluminum nitride particles 30 micrometers or larger to total aluminum nitride particles 30 micrometers or larger between 40 wt % and 60 wt % and demonstrate formulations in this range with various sized aluminum nitride particles.

Samples 1-5 also include boron nitride particles, while Samples 6 and 7 do not. These samples demonstrate that the objective TC and ER is achievable in formulations with or without boron nitride. These samples also show that including boron nitride resulted in higher TC formulations, which is generally desirable.

Samples A-C illustrate a formulations with only irregular shaped aluminum nitride particles that are 30 micrometers or larger and reveals that the ER is below 40 g/min when only the irregularly shaped aluminum nitride is present in the 30 micrometer or larger size.

Samples D, E, and G-I and M illustrate formulations with only spherical aluminum nitride particles that are 30 micrometers or larger and reveal that the TC value of the formulation is below 8.0 W/m*K in these formulations. Formulations G-I explore the effect of adding boron nitride, magnesium oxide or aluminum oxide to try to increase the TC, but reveals TC values of 8.0 more W/m*K are still not obtained.

Sample F illustrates a formulation with a blend of spherical and irregularly shaped aluminum nitride particles but with the wt % of the spherical particles exceeding 60 wt % slightly to 67 wt %. The formulation is a powdery paste that cannot be extruded.

Sample J illustrates a formulation with a blend of spherical and irregularly shaped aluminum nitride particles with the wt % of the spherical particles between 40 and 60 wt %, but uses irregular shaped aluminum oxide instead of spherical aluminum oxide in the particle size range of one to 5 micrometers. The resulting formulation is a powdery paste that cannot be extruded.

Samples K and L illustrate formulations using a blend of spherical and irregular aluminum nitride particles having particle sizes of 30 micrometers or more, but at wt % spherical particles that is either above or below 40-60 wt %. The resulting TC values are below 8.0 W/m*K.

What is claimed is:
1. A thermally conductive composition comprising:
a. a curable silicone composition comprising:
   i. a vinyldimethylsiloxy-terminated polydimethylpoly-siloxane having a viscosity in a range of 30 to 400 milliPascal*seconds;
   ii. a silicon-hydride functional crosslinker; and
   iii. a hydrosilylation catalyst;
   where the molar ratio of silicon-hydride functionality from the crosslinker to vinyl functionality is in a range of 0.5:1 to 1:1;
b. a filler treating agent comprising one or both of an alkyl trialkoxysilane and a mono-trialkoxysiloxy terminated dimethylpolysiloxane;
c. a thermally conductive filler mix comprising:
   i. 40 weight-percent or more aluminum nitride fillers comprising a blend of spherical and irregular shaped aluminum nitride particles, both the spherical and irregular shaped particles having an average particle size of 30 micrometers or more and where the spherical aluminum nitride fillers with a particle size of 30 micrometers or more are present at a concentration of 40 to 60 weight-percent of the total weight of aluminum nitride fillers having a particle size of 30 micrometers or more;
   ii. 25 weight-percent to 35 weight-percent spherical aluminum oxide particles having an average particle size of one to 5 micrometers;
   iii. 10 weight-percent to 15 weight-percent of an additional thermally conductive filler having an average particle size of 0.1 to 0.5 micrometers; and
   iv. optionally, boron nitride fillers having an average particle size of more than 20 micrometers;

where the weight-percent of each thermally conductive filler is relative to composition weight unless otherwise stated and the total amount of thermally conductive filler mix is 90-97 weight-percent of the composition weight.

2. The thermally conductive composition of claim 1, wherein the vinyldimethylsiloxy-terminated polydimethylpolysiloxane has a viscosity in a range of 60 to 80 milliPascal*seconds and comprises 1.2 to 1.4 weight-percent vinyl functionality.

3. The thermally conductive composition of claim 1, where the silicon-hydride functional crosslinker comprises one or more polysiloxane having chemical structures selected from (II) and (III):

$$H(CH_3)_2SiO - [(CH_3)_2SiO)]_x - Si(CH_3)_2H \quad (II)$$

$$(CH_3)_3SiO - [(CH_3)HSiO]_y[(CH_3)_2)SiO]_z - Si(CH_3)_3 \quad (III)$$

where subscript x has a value in a range of 10 to 100, subscript y has a value in a range of 3 to 30, and subscript z has a value in a range of 3 to 100.

4. The thermally conductive composition of claim 3, wherein the silicone-hydride functional crosslinker has chemical structure (II).

5. The thermally conductive composition of claim 1, wherein the alkyl trialkoxysilane is selected from C6 to C12 alkyl trimethoxysilanes and the mono-trialkoxysiloxyterminated dimethylpolysiloxane is selected from mono-trimethoxyterminated dimethyl polysiloxanes having an average chemical structure (IV):

$$(CH_3)_3SiO - [CH_3)_2SiO]_a Si(OCH_3)_3 \quad (IV)$$

where subscript a is a value in a range of 30 to 110.

6. The thermally conductive composition of claim 1, wherein the composition is free of magnesium oxide fillers.

7. The thermally conductive composition of claim 1, wherein the composition is free of boron nitride fillers.

8. The thermally conductive composition of claim 1, wherein the additional thermally conductive filler is zinc oxide.

9. An article comprising the thermally conductive composition of claim 1 on another material.

10. The article of claim 9, wherein the thermally conductive composition is between and in thermal contact with a heat generating component of an electronic device and one or more than one of a heat sink, cooling plate and metal cover for the electronic device.

* * * * *